(12) United States Patent
White, Jr.

(10) Patent No.: US 7,647,769 B2
(45) Date of Patent: Jan. 19, 2010

(54) HYDRAULIC TRANSAXLE FOR GARDEN CARE VEHICLE

(75) Inventor: Hollis N. White, Jr., Hopkinsville, KY (US)

(73) Assignee: White Drive Products, Inc., Hopkinsville, KY (US)

( * ) Notice: Subject to any disclaimer, the term of this patent is extended or adjusted under 35 U.S.C. 154(b) by 0 days.

(21) Appl. No.: 12/167,438

(22) Filed: Jul. 3, 2008

(65) Prior Publication Data
US 2008/0264055 A1    Oct. 30, 2008

Related U.S. Application Data

(63) Continuation of application No. 11/349,297, filed on Feb. 7, 2006, now Pat. No. 7,395,665.

(51) Int. Cl.
*F16D 39/00*   (2006.01)
(52) U.S. Cl. .............................. 60/485; 60/487; 60/586; 60/587
(58) Field of Classification Search .................. 60/337, 60/456, 485, 487, 586, 587, 714, 912
See application file for complete search history.

(56) References Cited

U.S. PATENT DOCUMENTS

| | | | |
|---|---|---|---|
| 3,177,665 A | | 4/1965 | Power |
| 3,749,195 A | * | 7/1973 | Vegners ..................... 418/61.3 |
| 3,794,195 A | | 2/1974 | Clevenger et al. |
| 3,805,526 A | | 4/1974 | Charron |
| 3,863,449 A | * | 2/1975 | White, Jr. ..................... 60/456 |
| 5,056,994 A | * | 10/1991 | Eisenmann et al. ......... 418/61.3 |
| 5,156,576 A | | 10/1992 | Johnson |
| 5,622,051 A | | 4/1997 | Iida et al. |
| 5,626,204 A | | 5/1997 | Johnson |
| 6,073,443 A | | 6/2000 | Okada et al. |
| 6,672,058 B1 | | 1/2004 | Langenfeld et al. |
| 6,827,562 B1 | | 12/2004 | Barto |

(Continued)

OTHER PUBLICATIONS

International Search Report and Written Opinion of the International Searching Authority dated Aug. 7, 2007.

*Primary Examiner*—Igor Kershteyn
(74) *Attorney, Agent, or Firm*—Rankin, Hill & Clark LLP

(57) ABSTRACT

A hydrostatic transmission assembly includes a first gerotor motor, a pump housing, a first variable displacement pump, a second gerotor motor, and a second variable displacement pump. The first gerotor motor includes a first output shaft aligned along a first axis. The pump housing connects to and contacts the first gerotor motor. The first variable displacement pump includes a first driven shaft mounted to the pump housing and aligned along a second axis, the second axis being generally perpendicular to the first axis (the first output shaft axis). The first variable displacement pump is in fluid communication with the first gerotor motor via passages in the pump housing. The second gerotor motor includes a second output shaft generally aligned along or generally parallel to the first axis. The second gerotor motor is connected to the pump housing on an opposite side of the pump housing as the first gerotor motor. The second variable displacement pump includes a second driven shaft mounted to the pump housing and aligned generally parallel to the second axis. The variable displacement pump is in fluid communication with the second gerotor motor via passages in the pump housing.

9 Claims, 6 Drawing Sheets

U.S. PATENT DOCUMENTS

| | | |
|---|---|---|
| 2003/0070429 A1* | 4/2003 | Jolliff et al. .................. 60/487 |
| 2005/0166589 A1 | 8/2005 | Sakikawa |
| 2006/0014608 A1 | 1/2006 | Mitchell et al. |
| 2007/0029118 A1 | 2/2007 | Acharya et al. |
| 2007/0137918 A1 | 6/2007 | Dong et al. |
| 2007/0180822 A1 | 8/2007 | White, Jr. |
| 2007/0193264 A1 | 8/2007 | Dong et al. |
| 2008/0120974 A1 | 5/2008 | Dong et al. |

* cited by examiner

HYDRAULIC TRANSAXLE FOR GARDEN CARE VEHICLE

This application is a continuation of U.S. patent application Ser. No. 11/349,297 filed on Feb. 7, 2006 now U.S. Pat. No. 7,395,665 and entitled "HYDRAULIC TRANSAXLE FOR GARDEN CARE VEHICLE," the entirety of which is incorporated herein by reference.

BACKGROUND

Hydraulically controlled gear driven drive axles are an efficient way of controlling the speed and direction of land vehicles, such as walk behind and ride-on lawnmowers, ATV, and tractors. Some known hydraulically controlled drive units include high reduction mechanical gearing that can compromise the relative smoothness of the control of the vehicle. In addition, these drive units may be inherently limited in the amount of ground engaging power, and thus unable to put more than a limited amount of the engine's horsepower into ground engaging tasks. This affects control, accuracy and longevity of the transaxle as well as compromising the vehicle's performance and otherwise limiting the vehicles applications.

Other known ground engaging transaxles are substantial in design and weight. Piston powered pumped units, while adaptable, have their own requirements and restrictions including the need for separate motors or the need of an associated gear transmission to apply power to the ground. While these known drive systems are functional, their compromise in cost and performance of each design is apparent.

SUMMARY

A hydrostatic transmission assembly includes a first gerotor motor, a pump housing, a first variable displacement pump, a second gerotor motor, and a second variable displacement pump. The first gerotor motor includes a first output shaft aligned along a first axis. The pump housing connects to and contacts the first gerotor motor. The first variable displacement pump includes a first driven shaft mounted to the pump housing and aligned along a second axis, the second axis being generally perpendicular to the first axis (the first output shaft axis). The first variable displacement pump is in fluid communication with the first gerotor motor via passages in the pump housing. The second gerotor motor includes a second output shaft generally aligned along or generally parallel to the first axis. The second gerotor motor is connected to the pump housing on an opposite side of the pump housing as the first gerotor motor. The second variable displacement pump includes a second driven shaft mounted to the pump housing and aligned generally parallel to the second axis. The variable displacement pump is in fluid communication with the second gerotor motor via passages in the pump housing.

According to a second embodiment, a hydrostatic transmission assembly includes a gerator motor, a variable displacement pump housing, and a variable displacement pump. The gerator motor includes an output shaft and a motor housing surrounding the output shaft. The motor housing defines a first surface generally normal to a rotational axis of the output shaft. The gerator motor further includes a first port and a second port. The variable displacement pump housing connects to the motor housing. The pump housing includes a second surface that abuts the first surface of the pump housing. The housing also includes a first generally linear passage and a second generally linear passage. The first passage communicates with the first port of the gerotor motor. The second passage communicates with the second port of the gerotor motor. The variable displacement pump is at least partially disposed in the pump housing. The pump includes a driven shaft aligned generally perpendicular to the output shaft. The pump also includes a pump chamber in communication with the first passage and the second passage.

According to another embodiment a hydrostatic transmission assembly includes a pump unit, a radiator, a first hydraulic motor, and a second hydraulic motor. The pump unit includes a first and second displacement pumps. The radiator connects to the pump unit and includes at least two passages in fluid communication with the first displacement pump. The first hydraulic motor connects to the radiator and communicates with the at least two passages of the radiator. The second hydraulic motor connects to the pump unit and communicates with the second displacement pump.

DETAILED DESCRIPTION

A hydrostatic transmission assembly 10 for a ground vehicle, for example a riding zero-turn mower, a walk-behind commercial lawn mower, garden tractor, an all-terrain vehicle, or a small self-contained tracked backhoe, uses a combination of components to provide a reliable, smooth, easy to control, high-torque power delivery package. Power input, control, and power delivery are apparent to the user.

Figure 1:
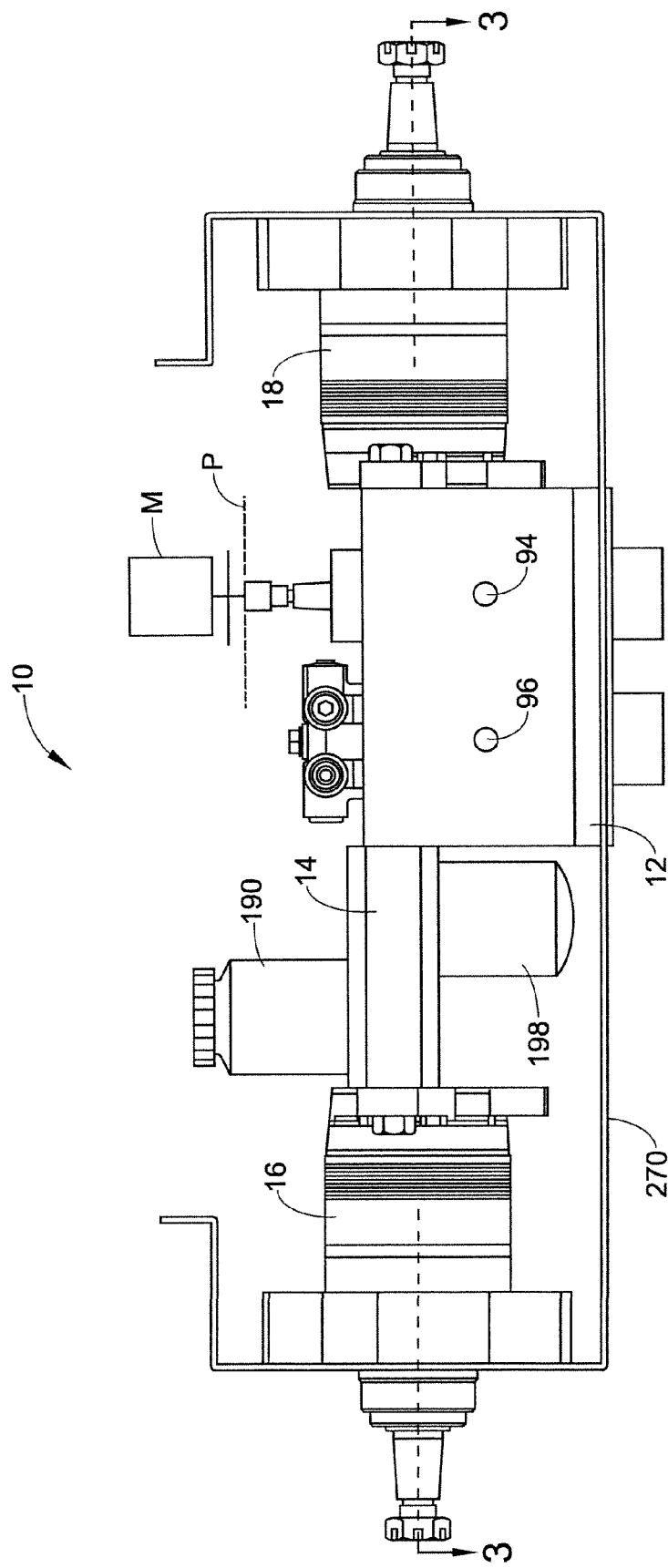
FIG. 1 is a side view of a hydrostatic transmission assembly.

With reference to FIG. 1, an embodiment of the drive assembly 10 includes a pump unit 12, a radiator 14, a first hydraulic power unit 16, and a second hydraulic power unit 18. As seen in FIG. 1, the radiator 14 contacts and connects directly to the pump unit 12. The first hydraulic unit 16 contacts and connects directly to the radiator 14 and the second hydraulic power unit 18 contacts and connects directly to the pump unit 12. Accordingly, a compact hydrostatic drive assembly is provided where the fluid communication between the pump unit 12 and the hydraulic power units 16 and 18 are within robust and durable housing units to provide a mechanically sufficient self-contained drive assembly.

Figure 2:
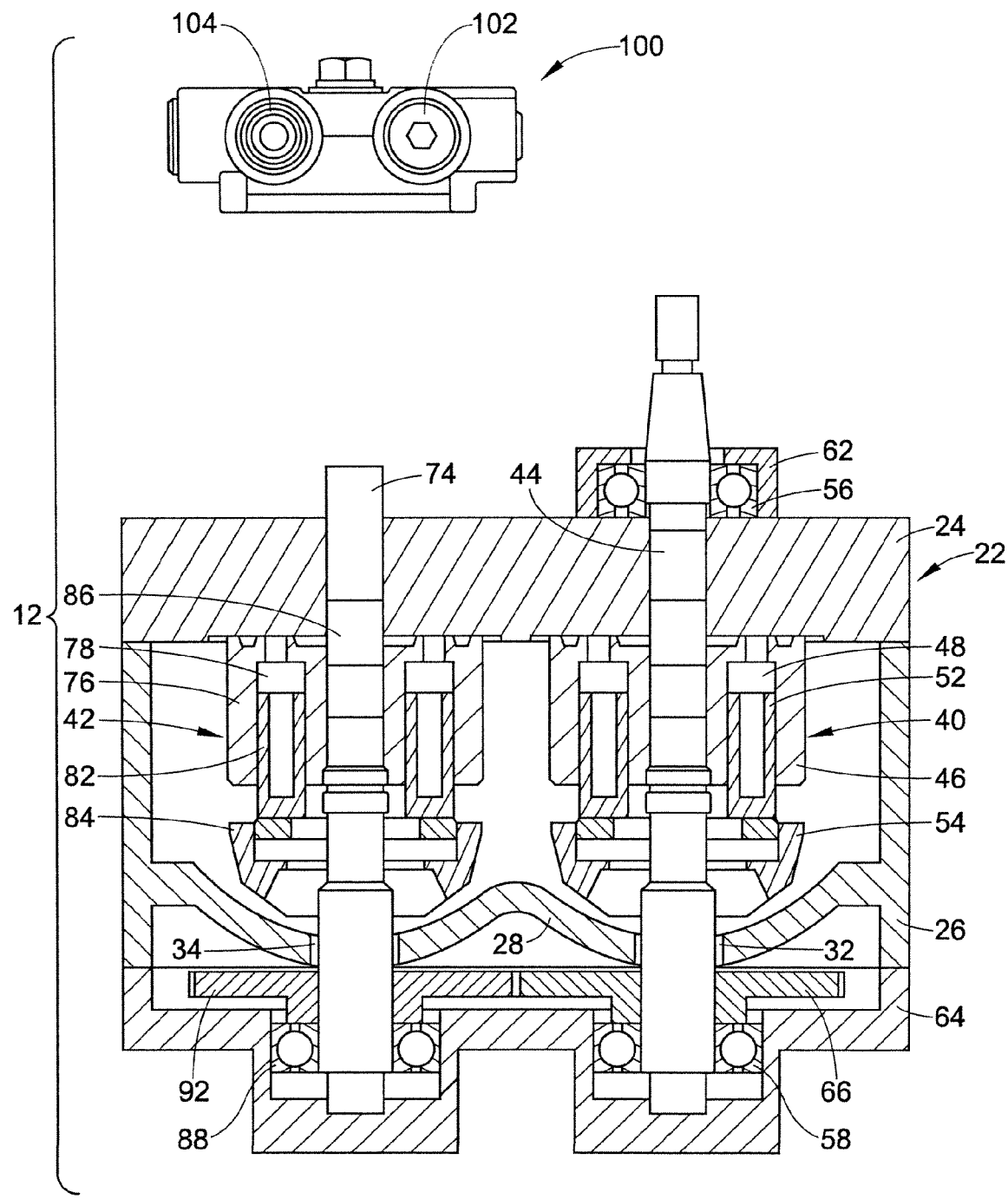
FIG. 2 is a side view of the pump unit of the hydrostatic transmission assembly of FIG. 1 with a portion shown in cross-section.
Figure 3:
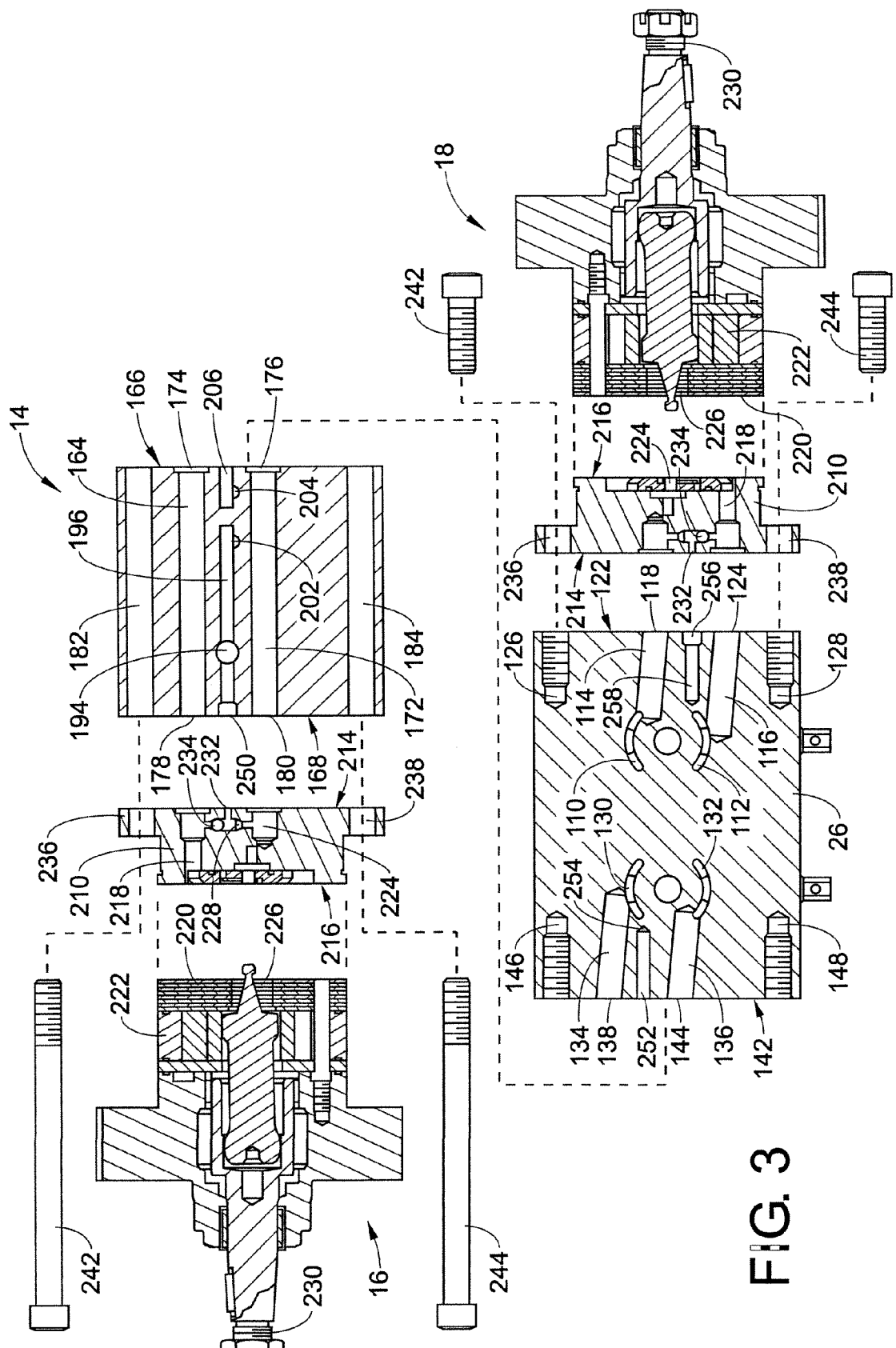
FIG. 3 is a cross-sectional view of the assembly of FIG. 1 along line 3-3 in FIG. 1.

With reference to FIGS. 2 and 3, the pump unit 12 includes a pump housing 22, which in this particular embodiment includes an upper plate 24 attached to a lower housing portion 26, which in the depicted embodiment takes a rectangular box-like configuration. A curved internal wall 28 is located in the lower housing portion 26 and includes a first opening 32 and a second opening 34. The pump housing 22 houses components of a first pump 40 and a second pump 42, which in the depicted pump unit 12 are variable displacement pumps.

The first pump 40 includes a driven shaft 44 that is driven by a motor M (FIG. 1, depicted schematically) that is external to the transaxle assembly 10. The motor M can be the motor that drives the vehicle as well as other components of the vehicle, for example mower blades, and the like. The motor M can operatively drive the driven shaft 44 through a transmission (not shown).

A rotatable cylinder block 46 connects to the driven shaft 44 so that the block 46 rotates with the shaft. The rotatable cylinder block 46 includes a plurality of chambers 48 that receive spring loaded pistons 52. A swash plate 54 contacts the pistons 52 to vary the pump chamber volume in each chamber 48. The swash plate 54 pivots about the rotational axis of the driven shaft 44. Bearings, e.g. an upper bearing 56 and a lower bearing 58 support the driven shaft 44. The upper bearing 56 is disposed on an opposite side of the upper plate 24 as the rest of the components of the first pump 40. As depicted, a bearing cap 62 mounts over the upper bearing 56 and connects to the upper plate 24 to protect the bearing. Likewise, a lower plate member 64 having a recess that receives the lower bearing 58 attaches to the lower housing portion 26. The lower bearing 58 is disposed on the opposite side of the internal wall 28 as the remainder of the components first pump 40.

The driven shaft 44 extends through the first opening 32 in the internal wall 28. The driven shaft 40 connects to a first circular gear 66. The first circular gear 66 is sandwiched between the lower bearing 58 and the internal wall 28 of the lower housing portion 26. Accordingly, the first driven gear 66 is separated from the remainder of the components of the first pump 40.

The second pump 42 has a very similar configuration to the first pump 40. The second pump 42 includes a driven shaft 74 that drives a cylinder block 76. The cylinder block 76 includes a plurality of chambers 78 that receive spring loaded pistons 82. A swash plate 84 contacts the spring-loaded pistons 82. The swash plate 84 can be displaced by being pivoted about the axis of rotation of the driven shaft 74 to vary the volume of the pump chamber defined in each chamber 78 of the cylinder block 76. The driven shaft 74 is also supported by bearings: an upper sleeve bearing 86 and a lower ball bearing 88, the lower ball bearing 88 being separated from the remainder of the components of the second pump 42 via the intermediate wall 28. The lower plate member 64 also includes a recess for receiving the lower ball bearing 88.

A circular gear 92 connects to the driven shaft 74. The circular gear 92 is disposed on an opposite side of the intermediate wall 28 as the remainder of the components of the second pump 42. The second gear 92 engages the first circular gear 66. Each gear 66 and 92 has the same diameter so that rotation of the first gear 66 at a first speed results in the rotation of the second gear 92 at the same speed. Accordingly, rotation of the first drive shaft 44 results in the rotation of the second driven shaft 74 at the same speed (but an opposite rotational direction) as the first driven shaft. The gears 66 and 92 in the depicted embodiment are made of powdered metal, and provide for an efficient connection between the first driven shaft 44 and the second drive shaft 74. Gears 66 and 92 allow for a common rotation motor M for the transaxle assembly. If desired, an intermediate gear can be disposed between the first gear 66 and the second gear 92 so that rotation of the first gear 66 in a first rotational direction results in rotation of the second gear 92 in the same rotational direction. Angular displacement of the swash plates 54 and 84 is controlled by control members, e.g., rods 94 and 96 (FIG. 1). Angular adjustment of the first swash plate 54 is controlled by control member 94 and the angular displacement of the second swash plate 84 is controlled by the control member 96. The operator of the vehicle can alter the volumetric output of each individual pump by manipulating the control member in a manner that is known in the art.

With reference back to FIG. 2, a charge pump 100 mounts to the upper plate 24 of the pump unit 12. The charge pump 100 is of a higher volume than needed for its charge function and includes in/out taps 102 and 104 to provide hydraulic power for an auxiliary feature of the vehicle, for example steering, a mower deck lift, or another auxiliary function. The charge pump 100 connects to the second driven shaft 74. Through the interconnection of the charge pump 100 to the driven shaft 74, the charge pump 100 is active whenever the first driven shaft 44 is rotated irrespective of the control condition of the pumps 40 and 42. The displacement of the charge pump 100 is set in respect to its use for both pumps 40 and 42 to provide a sufficient volume of flow to both. The hydraulic charge pump 100 recharges the oil that bypasses the active pump chambers 40 and 42. In the embodiment shown, the charge pump 100 also primes the pump units to provide an immediacy of operation under all operating conditions including a cold start.

As more clearly seen in FIG. 3, the upper plate 26 includes a plurality of passes and openings. First and second curved openings 110 and 112 respectively communicate with the chambers 48 (FIG. 2) of the cylinder block 46 (FIG. 2) to provide input and output ports for the first pump 40 depending on the direction of rotation of the first driven shaft 44 (FIG. 2). The first curved opening 110 communicates with a first linear passage 114 that communicates with the second hydraulic power unit 18 in a manner that will be described in more detail below. The second curved opening 112 communicates with a second linear passage 116 that communicates with the second hydraulic power unit 18 in a manner that will be described in more detail below. A first opening 118 is formed in a first planar surface 122 of the upper plate 26 where the first linear passage 114 terminates. A second opening 124 is also formed in the first planar surface 122 of the upper plate 26 and communicates with the second linear passage 116. First and second bolt openings 126 and 128, respectively, are also formed in the upper plate 126 to allow the second hydraulic unit 18 to attach to the pump unit 12.

The upper plate 26 also includes a third curved opening 130 and a fourth curved opening 132 that communicate with the chambers 78 (FIG. 2) of the cylinder block 76 (FIG. 2) of the second pump 42. The third curved opening 130 communicates with a third linear passage 134 that communicates with the first hydraulic unit 16 in a manner that will be described in more detail below. The fourth curved opening 132 communicates with a fourth linear passage 136 that communicates with the first hydraulic power unit 16 in a manner that will be described in more detail below. A third opening 138 is formed in a second planar surface 142 of the upper plate 26 that is in communication with the third linear passage 134. A fourth opening 144 is provided in the second planar surface 142 and communicates with the fourth linear opening 136. Third and fourth bolt holes 146 and 148, respectively, are provided in the upper plate 26 to allow the radiator 14 to attach to the pump unit 12.

With reference back to FIG. 1, the radiator 14 contacts and connects to the pump unit 12. In the depicted embodiment, as more clearly seen in FIG. 4, the radiator 14 is a one-piece integral casing 160 made of a heat conductive material, preferably metal. The radiator 14 includes a plurality of fins 162 formed with the casing 160 for dissipating heat developed in the assembly 10. Although the radiator shown is unsymmetrical with respect to the entire assembly 10, in that the radiator 14 extends between the first hydraulic power unit 16 and the pump unit 12, this asymmetry is appropriate because of the substantially similar volumetric flow through both power units through the reservoir (described below) for the assembly. With approximately 50% fluid going through each pump 40, 42, the result is that 25% of the assembly's total fluid volume is subject to radiator action. If desired, a radiator substantially similar to that shown in FIG. 4 can also be interposed between the pump unit 12 and the second hydraulic powered unit 18. Also, using radiators of different length can be utilized in vehicles having different track or frame without other modifications of the remainder of assembly 10.

With reference back to FIG. 3, a plurality of passages are provided in the radiator 14 to allow for communication between the first hydraulic powered unit 16 and the pump unit 12 (and optionally between the second hydraulic power unit 18 and the pump unit 12 when more than one radiator is provided). As more clearly seen in FIG. 3, the radiator includes a first linear passage 164 that extends from a first planar surface 166 of the casing 160 to a second planar surface 168 of the casing 160. The radiator 14 also includes a second linear passage 172 that extends from a first planar surface 166 to the second planar surface 168. A first opening 174 is formed in the first planar surface 166 and communicates with the first linear passage 164. A second opening 176 is formed in the first planar surface 166 and communicates with the second linear passage 172. When assembled, the first planar surface 166 of the casing 160 of the radiator 14 contacts the second planar surface 142 of the upper plate 26 of the pump unit 12. If desired, the planar surfaces can take other configurations so long as the interface between the radiator 14 and the upper plate 26 is such that fluid passing between the two does not leak too much. Accordingly, the third linear passage 134 in the upper plate 26 communicates with the first linear passage 164 in the casing 160. Likewise, the second linear passage 172 in the casing 160 communicates with the fourth linear passage 136 in the upper plate 26. A third port or opening 178 is formed in the second surface 168 in the second casing 160 and communicates with the first linear passage 164. A fourth port or opening 180 is also formed in the second surface 168 and communicates with the second linear passage 172.

First and second bolt holes 182 and 184 are provided on opposite sides of the casing 160 of the radiator 114. The first bolt hole 182 aligns with the third bolt hole 146 in the upper plate 26. Likewise, the second bolt hole 184 aligns with the fourth bolt hole 148 in the upper plate 26.

Figure 4:
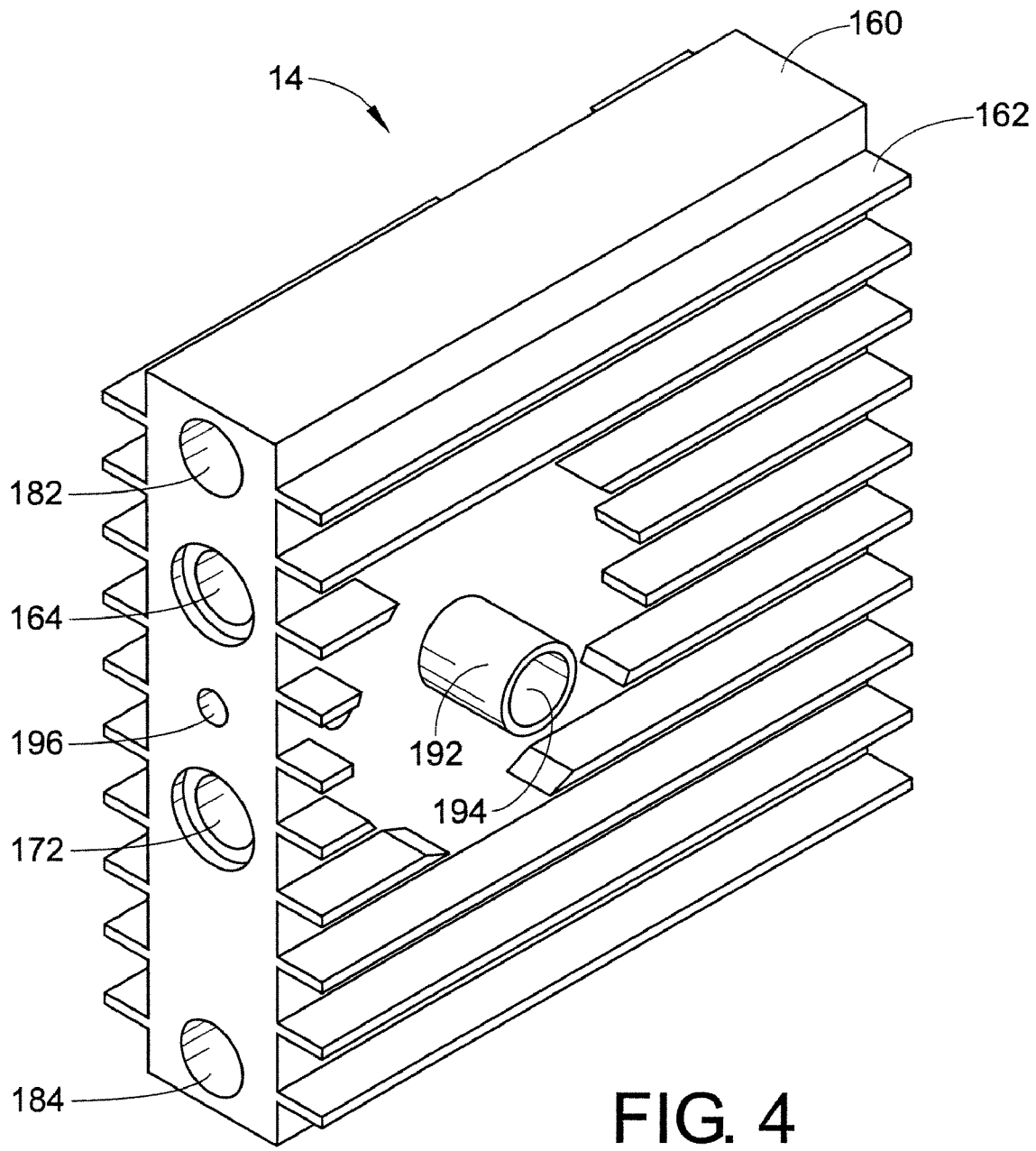
FIG. 4 is a perspective view of a radiator of the assembly of FIG. 1.

With reference back to FIG. 1, a reservoir 190 for the assembly 10 attaches to the radiator casing 160. With reference to FIG. 4, a nipple 192, which can be threaded, is provided on the casing 160 to allow for a connection between the reservoir 190 and the radiator 14. The nipple 192 defines a port 194 (see also FIG. 3) that communicates with a third internal passage 196 that extends from the second planar surface 168 toward the first planar surface 166 of the casing 160.

With reference back to FIG. 1, a filter 198 also attaches to the casing 160 of the radiator 14. A nipple (not visible) similar to the nipple 192 (FIG. 4) is provided to attach the filter 198 to the casing 160. With reference back to FIG. 3, a first filter port 202 communicates with the first central passage 196 and a second filter port 204 communicates with a second central passage 206. The second central passage terminates at the first planar surface 166 of the casing 160. Accordingly, fluid travels through the filter 198 between passage 196 and passage 206.

The radiator 14 contacts an end port plate 210, which can comprise a portion of a motor housing, of the first hydraulic powered device 16. The end port plate 210 includes a planar first surface 214 that contacts the second planar surface 168 of the casing 160 of the radiator 14 when the assembly 10 is assembled. The planar surfaces can take other complementary configurations. The plate 210 also includes a second planar surface 216 opposite the first planar surface 214. A first passage 218 extends from a first planar surface 214 through the body 212 to the second surface 216. The first passage 218 communicates with the first linear passage 164 located in the casing 160 of the radiator 14. The first passage 218 in the end port plate 210 also communicates with a first port 220 in communication with a gerotor structure 222 of the first hydraulic power unit 16. The plate 210 also includes a second passage 224 that communicates with the second passage 172 formed in the casing 160 of the radiator 14. The second passage 224 also communicates with a second port 226 of the gerotor structure 222 of the first hydraulic unit 16. The hydraulic power unit can be a hydraulic motor, such as the hydraulic motor disclosed in U.S. Pat. No. 6,257,853 which is incorporated by reference, as well as any other known hydraulic power unit capable of in line inlet and outlet.

The end port plates can replace the end cap in rear ported known motor units. This provides fluidic and mechanical interconnection of a single part. The in-line fluid ports, as opposed to lateral fluid connections in many known hydraulic motors, increases the fluidic efficiency of the assembly by reducing heat and restriction losses. Such a configuration also allows for a low-profile assembly 10. Nevertheless, the radiator casing 160 is amenable to alternative installations through a modification of the end port plates.

The hydraulic power unit 16 includes an output shaft 230 that can drive a wheel (not shown) of the vehicle. The rotational axis of the output shaft 230 is at least generally perpendicular to the rotational axis of the driven shaft 44 of the first pump unit 40. Such a configuration allows for a vertical drive shaft of the motor M, which is almost universally preferred for mowers, while simultaneously providing for a simple single pulley direct drive connection, depicted schematically at P (FIG. 1). In the end port plate 210, an internal valve passage 228 interconnects the first passage 218 to the second passage 224. A third linear passage 232 extends inwardly from the first planar surface 214 and communicates with the internal valve passage 228. A ball 234 is disposed in the internal valve passage 228.

The plate 210 also includes two bolt holes 236 and 238. A bolt 242 is received in the bolt hole 236 and extends through the bolt hole 182 in the radiator 14 and in into the bolt hole 146 in the upper plate 26 of the pump unit 12. A second bolt 244 is received in the bolt hole 238 of the end port plate 210 and is also received through the bolt hole 184 in the radiator 14 and finally received in the bolt hole 148 of the upper plate 26. Accordingly, the hydraulic motor 16 attaches to the pump unit 12 through the radiator 14.

As fluid is pumped by the second pump 42, fluid efficiently passes through the linear passage 134 in the upper plate 26 of the pump unit 12, into the first passage 164 in the casing 160 of the radiator 14, into the first passage 218 of the end port plate 210 through the first port 220 to drive the gerotor structure 222 of the first hydraulic powered unit 16 to rotate the output shaft 230. Fluid then passes through the second port 226 of the hydraulic power unit 16 into the second passage 224 of the end port plate 210, into the second passage 172 in the casing 160 of the radiator 14 and into the fourth linear passage 136 of the upper plate 26 of the pump unit 12. The ball 234 is normally seated to preclude communication between the first passage 218 of the end port plate 210 and the second passage 224 of the end port plate.

Controlled leakage is provided in the assembly via the valve passage 228 being in communication with the third linear passage 232 and the second passage 224 in the end port plate 210. A relief valve 250 is in communication with the third passage 232 to allow controlled leakage. Accordingly, fluid can flow through the second linear passage 224 into the internal valve passage 228 and through the third linear passage 232 towards and into the third passage 196 in the casing 160 of the radiator 14. Fluid flowing through the third passage 196 flows through the filter 198 (FIG. 1) via port 202 and exits via port 204 into the second central passage 206 into a central passage 252 formed in the upper plate 26 of the pump unit 12. The central passage 226 in the upper plate 26 of the pump unit 12 is in communication with an inactive chamber 78 of the second pump 42 and also includes a relief mechanism 254. The central passage 252 also communicates with the charge pump 100 so that the reservoir 190 (FIG. 1) is in communication with the charge pump 100. If there is a pressure spike in the assembly, the ball 234 unseats to allow for fluid communication between the first passage 218 of the end port plate 210 and the reservoir 190 (FIG. 1) via the internal valve passage 228, the third linear passage 232 and the central passage 196 in the casing 160 of the radiator 14.

The first pump 40 communicates with the second hydraulic power device 18 in a similar manner as the second pump 42 communicates with the first hydraulic powered device 16. In the depicted embodiment, the first hydraulic power device 16 is identical to the second hydraulic power device 18. The first hydraulic power device 16 need not be identical; however, the general concepts that will be disclosed below will be generally the same where the first hydraulic power device is similar to the second hydraulic power device. For the sake of brevity, components of the second hydraulic motor 18 will be described with reference to the same reference numerals as the first hydraulic motor 16.

The first pump 40 in the pump unit 12 delivers fluid through the curved opening 112 through the passage 116 into the first passage 218 in the end port plate 210 and through the first port 222 of the gerotor structure 234. The fluid exits the gerotor structure 234 through the second port 226 and into the second passage 224 of the end port plate 210 and into the passage 114 and the upper plate 24 of the pump unit 12 to communicate with the first pump 40 via the curved opening 110. The ball 234 is normally seated to preclude fluid from passing from the first passage 218 in the end port plate into the third passage 232; however, should a pressure spike occur, fluid can pass from the first passage 218 into the third passage 232 and towards a relief valve 256 formed in an internal passage 258 of the upper plate 24.

The above disclosed transmission assembly 10 provides all or nearly all of the fluid passages for the transmission assembly inside robust housings with very little changes in direction of the fluid. This differs from transmission assemblies that include intervening hoses between the pump unit and the drive unit. As discussed above, fluid communication between the pump unit and the drive unit is provided by linear or nearly linear fluid passages having no intervening hoses. Such a configuration reduces fluid leakage and provides a more efficient delivery of fluid. The assembly is provided in a manner so that components of the assembly can be easily interchanged. For example, many different hydraulic motors can attach to the pump unit and/or the radiator casing. All of the components of the transmission assembly can be mounted to one another and therefore mounted as one unit to the vehicle. Such a configuration enhances the structural and rotational integrity of the power input and also simplifies the remainder of the vehicle to which the transmission is to be mounted.

As discussed above, all of the components can be mounted to one another. With reference back to FIG. 1, a torque tension member 270 mounts to the first hydraulic power unit 16 and extends to and mounts to the second hydraulic power unit 18. The torque tension member reduces angular flexing between the first hydraulic power unit 16 and the second hydraulic unit 18 at opposite ends of the transmission assembly 10. In operation, the torque tension member 270 compensates for torque differential flexing of the transmission assembly 10 and the associated vehicle, thus contributing to the longevity of each.

Figure 5:
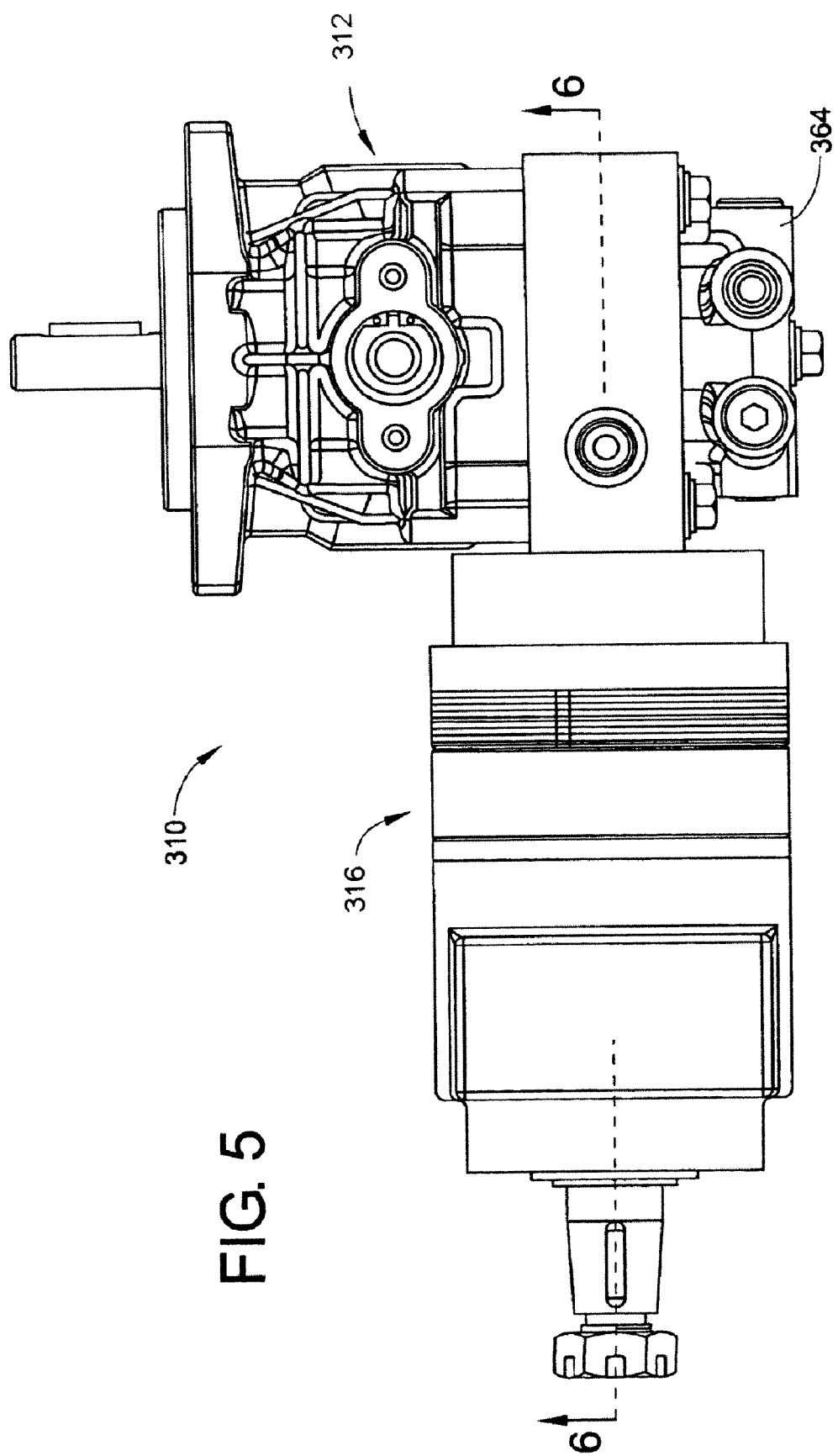
FIG. 5 is a side view of an alternative embodiment of a hydrostatic transmission assembly.
Figure 6:
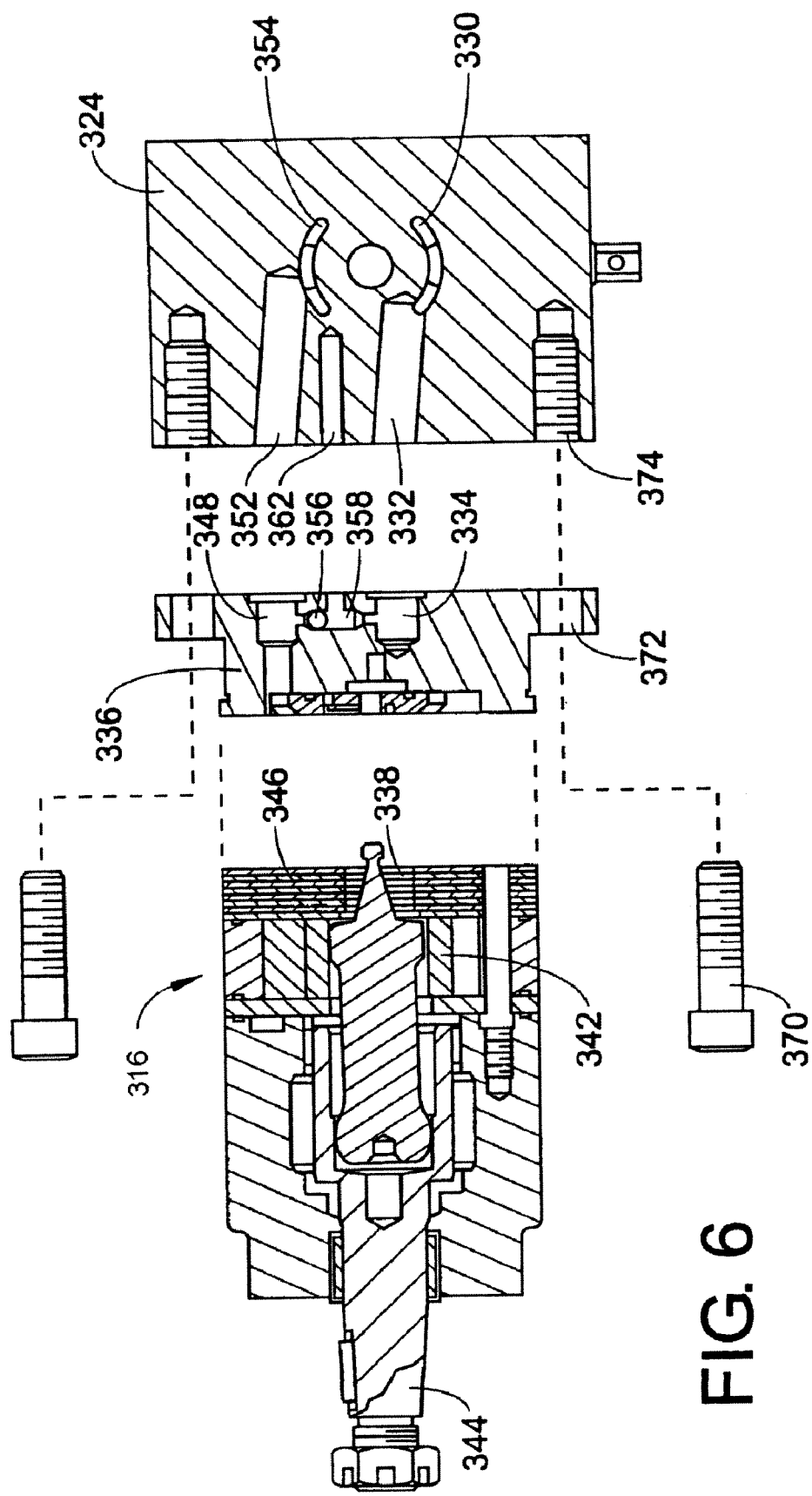
FIG. 6 is an exploded view of a cross-section taken along lines 6-6 of FIG. 5.

With reference to FIGS. 5 and 6, an alternative embodiment of a hydrostatic transmission assembly 310 is disclosed. As opposed to having two pumps drive two separate hydraulic motors, one pump can drive one hydraulic motor. As opposed to known transmission assemblies, the embodiment disclosed in FIGS. 5 and 6 provides for a direct mechanical and fluid connection between the pump unit and the drive unit without any intervening hoses. Accordingly, a direct and efficient delivery of fluid is provided to the drive unit, as compared to known assemblies.

As seen in FIG. 5, a hydraulic power unit 316, for example hydraulic motor such as the one described above in FIGS. 1 and 3, directly attaches to a pump unit 312 in a similar manner in the assemblies shown at the right side of FIG. 1. Such a connection, e.g. no intervening hoses or changes in direction of the fluid passages, provides for a sturdy and efficient transmission assembly.

The pump unit 312 is similar to the pump unit 12 disclosed in FIG. 2; however, the pump unit only includes one variable displacement pump. The variable displacement pump (not shown) in the pump unit 312 is similar in configuration to either the first pump 40 or the second pump 42 disclosed in FIG. 2. The pump unit includes a housing portion 324, similar to upper plate 24, that includes a plurality of fluid passages to allow the pump to communicate with the hydraulic motor 316.

Fluid is pumped by the pump through a first curved passage 330 into a linear passage 332 and into a first linear passage 334 formed in an end port plate 336 of the hydraulic motor 316. Fluid then passes into a first fluid port 338 of the hydraulic motor to drive a gerotor structure 342 which rotates an output shaft 344. Fluid then travels through a second port 346 back into a second linear passage 348 in the end port plate 346. Fluid then passes into a second linear passage 352 formed in the housing portion 324 of the pump unit housing and into a second curved port 354 which communicates with the pump. A ball 356 is disposed in a passage 358 between the first linear passage 334 and the second linear passage 348 in the end port plate 336. Normally, the ball 356 is seated to preclude communication between the first passage 334 and the second passage 348. If a pressure spike were to occur, the ball 356 can be unseated to allow for communication between the second passage 348 and relief valve 362 provided in the pump unit housing. With reference back to FIG. 5, a charge pump 364 can communicate with a pump disposed in the pump unit 312 in a similar manner as the charge pump 100, described above.

With reference back to FIG. 6, the hydraulic motor 316 attaches directly to the pump unit 312 via bolts 370 received through openings 372 in the end port plate 36 and the openings 374 and the pump unit 312.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A hydrostatic transmission assembly comprising:
a pump unit comprising at least one displacement pump;
a connector connected to the pump unit and including at least two passages in fluid communication with the pump unit;
at least one rear ported hydraulic motor connected to the connector and in communication with the at least two passages of the connector;
wherein the connector is an end port plate or a radiator.

2. The hydrostatic transmission assembly of claim 1, wherein:
the pump unit comprises first and second displacement pumps;
wherein the connector comprises a radiator connected to the pump unit and includes the least two passages in fluid communication with the first displacement pump;
wherein the at least one hydraulic motor includes a first hydraulic motor connected to the radiator and in communication with the at least two passages of the radiator, and a second hydraulic motor connected to the pump unit and in communication with the second displacement pump.

3. The assembly of claim 2, further comprising a filter and a reservoir each in fluid communication with at least one of the passages in the radiator.

4. The assembly of one of claim 2, wherein the first displacement pump includes a driven shaft that rotates about a first axis and the first hydraulic motor includes an output shaft that rotates about a second axis, the first axis being generally perpendicular to the second axis.

5. The assembly of claim 4, wherein the second displacement pump includes a driven shaft that is operatively connected to the driven shaft of the first displacement pump.

6. The assembly of claim 5, further comprising a charge pump in fluid communication with at least one of the displacement pumps and being driven by the driven shaft of at least one of the displacement pumps.

7. The assembly of claim 1, wherein the pump unit includes a driven shaft and the hydraulic motor is a gerotor motor having an output shaft that is generally perpendicular to the driven shaft.

8. A hydrostatic transmission assembly comprising:
a gerotor structure;
an output shaft connected with the gerotor structure;
a motor housing enclosing the output shaft;
an end port plate connected with the motor housing, the end port plate including a planar end port plate surface, a first bore and a second bore, each bore extending into the end port plate from the planar end port plate surface and being in communication with the gerotor structure, the planar end port plate surface being normal to a rotational axis of the output shaft;
a variable displacement pump housing including a first generally linear passage and a second generally linear passage each terminating at a planar pump housing surface, the pump housing being connected to the end port plate with the planar pump housing surface contacting the planar end port plate surface, the first passage being in communication with the first bore, the second passage being in communication with the second bore; and
a variable displacement pump disposed in the pump housing, the pump including a driven shaft aligned generally perpendicular to the output shaft, and a pump chamber in communication with the first passage and the second passage.

9. The transmission of claim 8, wherein the planar pump housing surface is normal to the rotational axis of the output shaft.

* * * * *